US009094826B2

(12) United States Patent
Tsumura

(10) Patent No.: US 9,094,826 B2
(45) Date of Patent: Jul. 28, 2015

(54) WIRELESS COMMUNICATION SYSTEM AND TERMINAL-DEVICE AUTHENTICATION METHOD IN WIRELESS COMMUNICATION SYSTEM

(75) Inventor: Naoki Tsumura, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 20 days.

(21) Appl. No.: 14/131,008

(22) PCT Filed: Jul. 9, 2012

(86) PCT No.: PCT/JP2012/068035
§ 371 (c)(1),
(2), (4) Date: Jan. 6, 2014

(87) PCT Pub. No.: WO2013/008939
PCT Pub. Date: Jan. 17, 2013

(65) Prior Publication Data
US 2014/0157388 A1   Jun. 5, 2014

(30) Foreign Application Priority Data

Jul. 11, 2011   (JP) ................................. 2011-153125

(51) Int. Cl.
*H04W 12/06*   (2009.01)
*H04L 9/08*   (2006.01)
(Continued)

(52) U.S. Cl.
CPC ............. *H04W 12/06* (2013.01); *H04L 9/0822* (2013.01); *H04L 9/3228* (2013.01); *H04L 63/0478* (2013.01); *H04L 63/107* (2013.01); *H04L 2209/80* (2013.01)

(58) Field of Classification Search
CPC combination set(s) only.
See application file for complete search history.

(56) References Cited

U.S. PATENT DOCUMENTS 7,904,041 B2 *   3/2011   Feher ......................... 455/151.1
8,176,508 B2 *   5/2012   Franklin et al. ................. 725/22
(Continued)

FOREIGN PATENT DOCUMENTS

EP   1 750 573 A0   2/2007
JP   04-027802   1/1992
(Continued)

OTHER PUBLICATIONS

International Search Report Issued Aug. 7, 2012 in PCT/JP2012/068035 Filed Jul. 9, 2012.
(Continued)

*Primary Examiner* — Beemnet Dada
(74) *Attorney, Agent, or Firm* — Oblon, McClelland, Maier & Neustadt, L.L.P.

(57) ABSTRACT

A wireless communication system includes code transmitters (20a, 20b) each configured to transmit a time-varying code; code receivers (30a, 30b) each configured to receive the time-varying codes transmitted from the code transmitters (20a, 20b) and generate a fingerprint based on the received time-varying codes, the fingerprint being unique to a space where the time-varying codes are receivable; and terminal devices (40a, 40b) configured to establish wireless communication connection therebetween with authentication. The terminal devices (40a, 40b) are connected to the code receivers (30a, 30b), respectively. Each terminal device (40a, 40b) includes a fingerprint acquiring unit configured to acquire the fingerprint from the code receiver (30a, 30b), a wireless communication unit configured to transmit and receive the fingerprint via wireless communication, and an authentication unit configured to authenticate another terminal device if the fingerprint received from the another terminal device matches the fingerprint acquired from the code receiver connected thereto.

10 Claims, 14 Drawing Sheets

(51) Int. Cl.
*H04L 9/32* (2006.01)
*H04L 29/06* (2006.01)

(56) References Cited

U.S. PATENT DOCUMENTS

| | | | |
|---|---|---|---|
| 8,320,939 B1 * | 11/2012 | Vincent | 455/456.1 |
| 8,433,320 B2 * | 4/2013 | Gresset et al. | 455/436 |
| 8,602,293 B2 * | 12/2013 | Hammad | 235/375 |
| 8,744,481 B2 * | 6/2014 | Baldemair et al. | 455/456.1 |
| 8,805,352 B2 * | 8/2014 | Mathews | 455/418 |
| 2004/0177280 A1 | 9/2004 | Maruyama et al. | |
| 2006/0133338 A1 | 6/2006 | Reznik et al. | |
| 2007/0113092 A1 | 5/2007 | Nishida et al. | |
| 2008/0222701 A1 | 9/2008 | Saaranen et al. | |
| 2009/0089565 A1 | 4/2009 | Buchanan et al. | |
| 2010/0077223 A1 | 3/2010 | Maruyama et al. | |

FOREIGN PATENT DOCUMENTS

| | | |
|---|---|---|
| JP | 2002-016968 | 1/2002 |
| JP | 2002-290416 | 10/2002 |
| JP | 2004-206475 | 7/2004 |
| JP | 2006-238343 | 9/2006 |
| JP | 2006-345082 | 12/2006 |
| JP | 2007-081969 | 3/2007 |
| JP | 2008-227846 | 9/2008 |

OTHER PUBLICATIONS

Takahiro Honda, et al., "A Common Key Generation Technique Based on Similarity of Received Signal Strength for Secure Wireless Face-to-face Communication", Proceedings of the DICOMO2009 symposium, IPSJ Symposium Series, Information Processing Society of Japan, Jul. 1, 2009, vol. 2009, No. 1, pp. 879-886.

Extended European Search Report issued May 18, 2015 in Patent Application No. 12811986.4.

\* cited by examiner

… (1)

WIRELESS COMMUNICATION SYSTEM AND TERMINAL-DEVICE AUTHENTICATION METHOD IN WIRELESS COMMUNICATION SYSTEM

TECHNICAL FIELD

The present invention relates to a wireless communication system and a terminal-device authentication method in the wireless communication system.

BACKGROUND ART

Terminal devices connectable to a wired or wireless LAN (Local Area Network) are growing in number and convenience of information exchange has been greatly improved as information and communication technology (ICT) infrastructure is being deployed. As communication standards for such LANs, the IEEE 802.3 standard for wired LANs and the IEEE 802.11 standard for wireless LANs are widely used.

The IEEE 802.11 standard incorporates network management methods, such as a terminal-device authentication method, of the IEEE 802.3 standard for wired LANs. Constructing a wireless LAN in accordance with the IEEE 802.11 standard allows settings of terminal devices to be made through similar processes at transition from a wired LAN to a wireless LAN or for combined use of a wired LAN and a wireless LAN. However, convenience native to wireless communication is impaired in some cases as a result of incorporating the management methods for wired LANs into a wireless LAN.

For example, the IEEE 802.11 standard requires that cumbersome authentication steps should be performed when connecting a terminal device to a network to determine authenticity of the terminal device and the like as does the IEEE 802.3 standard.

Meanwhile, wireless technologies are also widely used in interfaces, such as projectors and displays, for example, for one-to-one connection to a personal computer (PC). A security function similar to that for network connection, namely, a security function requirement set by the IEEE 802.11 standard, is also inherited to authentication for such connection.

Such one-to-one interface connection is in many cases temporary connection used only during a period of meeting, for example, and it is clearly undesirable that many cumbersome steps are required to establish the connection or to change a terminal device to be connected.

The same holds true to temporary connections between a plurality of terminal devices in a confined area in such a circumstance, which is arising more frequently as variety of electronic information increases, where terminal devices such as PCs are brought into a meeting room or the like to share a file.

A possible solution for this problem is personal area network (PAN) such as Bluetooth (registered trademark) that performs terminal-device authentication by causing terminal devices to exchange an authentication code which is called a personal identification number (PIN) code or a passcode.

Known examples of a wireless communication terminal device that uses Bluetooth (registered trademark) described above include a wireless communication terminal device in which an equipment list containing equipment IDs, profile types (types of equipment), and positional information about installation locations of other wireless communication terminal devices (e.g., equipment present in an office) on a per-wireless-communication-terminal-device basis is stored in advance. In response to user's selection of a wireless communication terminal device at a desired installation location, for example, from the equipment list displayed on each of the wireless communication terminal devices, wireless communication connection is established between a wireless communication terminal device of the user and the selected wireless communication terminal device (see Japanese Patent Application Laid-open No. 2002-290416, for example).

However, the wireless communication terminal device described in Japanese Patent Application Laid-open No. 2002-290416 premises that the positional information is stored in the equipment list in advance. Accordingly, when the wireless communication terminal has been relocated from its installation location, the positional information in the equipment list becomes useless. For this reason, with the conventional wireless communication terminal device described above, a communications partner cannot be selected appropriately from the equipment list in such an application where temporary communication connection is carried out between wireless communication terminal devices moved into a meeting room or the like.

Furthermore, in a PAN such as Bluetooth (registered trademark), a connection range is indefinite because means that explicitly specifies a connectable physical range (e.g., within a meeting room, at distances up to 10 meters, or the like) is not provided, and it is necessary to perform an authentication process, such as exchange of a PIN code, for ensuring a security function similar to that of network communication for identification of a target object which is a connection target. Accordingly, connection cannot be established easily.

Thus, authentication and communication establishing means convenient and suited for circumstances where temporary connection between terminal devices in a predetermined area, such as a meeting room, for example, is desirable is not provided yet.

Therefore, there is a need for a system capable of establishing communication connection in wireless communication in a temporarily-used area, such as a meeting room, by performing authentication of terminal devices easily and quickly by utilizing a fact that the terminal devices are at a same place at same time.

DISCLOSURE OF INVENTION

It is an object of the present invention to at least partially solve the problems in the conventional technology.

According to an embodiment, there is provided a wireless communication system that includes a plurality of code transmitters each configured to transmit a time-varying code, the time-varying codes transmitted from the code transmitters being different from each other; a plurality of code receivers each configured to receive the time-varying codes transmitted from the code transmitters and generate a fingerprint based on the received time-varying codes, the fingerprint being unique to a space where the time-varying codes are receivable; and a plurality of terminal devices configured to establish wireless communication connection therebetween with authentication, the terminal devices being connected to the code receivers, respectively. Each of the terminal devices includes a fingerprint acquiring unit configured to acquire the fingerprint from the code receiver connected thereto, a wireless communication unit configured to transmit and receive the fingerprint via wireless communication, and an authentication unit configured to authenticate, as a communications partner, another one of the terminal devices if the fingerprint received by the wireless communication unit from the another one of the terminal devices matches the fingerprint acquired by the fingerprint acquiring unit from the code receiver connected thereto.

According to another embodiment, there is provided a terminal-device authentication method in a wireless communication system including a plurality of terminal devices configured to establish wireless communication connection therebetween with authentication. The terminal-device authentication method includes transmitting, by each of the code transmitters, a time-varying code, the time-varying codes transmitted from the code transmitters being different from each other; receiving, by a plurality of code receivers connected to the terminal devices respectively, the time-varying codes transmitted from the code transmitters; generating, by each of the code receivers, a fingerprint based on the received time-varying codes, the fingerprint being unique to a space where the time-varying codes are receivable; acquiring, by each of the terminal devices, the fingerprint from the code receiver connected thereto; transmitting, by each of the terminal devices, the fingerprint via wireless communication; receiving, by each of the terminal devices, the fingerprint via the wireless communication; and authenticating, as a communications partner of one of the terminal devices, another one of the terminal devices if the fingerprint received from the another one of the terminal devices matches the fingerprint acquired by the one of the terminal devices.

The above and other objects, features, advantages and technical and industrial significance of this invention will be better understood by reading the following detailed description of presently preferred embodiments of the invention, when considered in connection with the accompanying drawings.

BEST MODE(S) FOR CARRYING OUT THE INVENTION

A first embodiment of the present invention is described below with reference to the drawings.

The wireless communication system according to the present embodiment includes two code transmitters each transmitting a piece of random data as time-varying codes by emitting modulated signal beams at a predetermined beam angle, code receivers which are placed in an area where the beams emitted from the two code transmitters intersect and each of which receives the pieces of random data from the two code transmitters to generate a fingerprint based on the received two pieces of random data (for example, by combining these pieces of random data), and terminal devices respectively connected to the code receivers. Each of the terminal devices obtains the fingerprint from the code receiver connected to the terminal device, transmits the obtained fingerprint to and receives the obtained fingerprint from another terminal device by wireless communication, authenticates, as a communications partner, the another terminal device that has transmitted the same fingerprint as that of the terminal device, and establishes wireless communication connection therewith.

In this specification, the fingerprint is defined as information that allows observers to determine that the observers are present at a same place at same time and that is unique to the time and the place.

Figure 1:
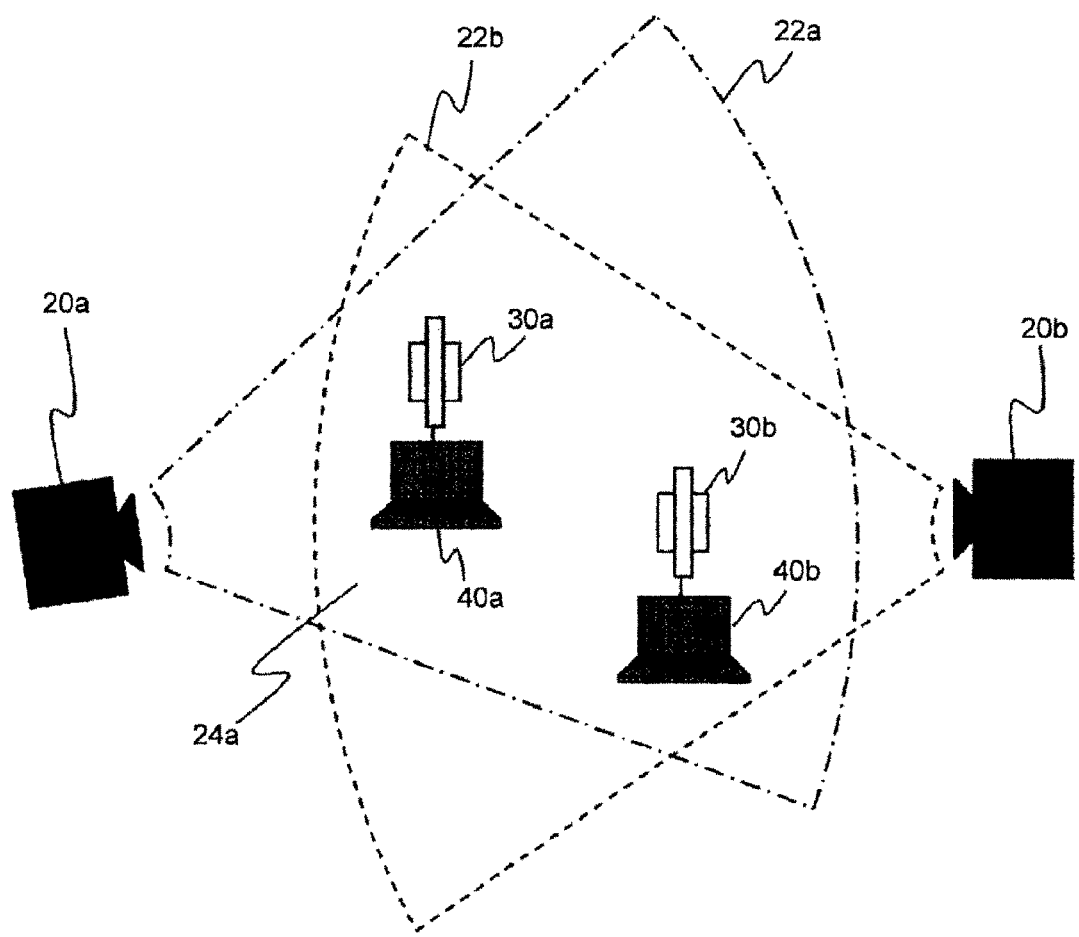
FIG. 1 is a diagram illustrating a configuration of a wireless communication system according to a first embodiment.

FIG. 1 is a block diagram illustrating a configuration of the wireless communication system according to the first embodiment of the present invention.

The wireless communication system includes two code transmitters 20a and 20b, code receivers 30a and 30b that each receive beams emitted from the code transmitters 20a and 20b, and terminal devices 40a and 40b, which are personal computers (PCs) or the like connected to the code receivers 30a and 30b, respectively. Connection between the code receiver 30a and the terminal device 40a and connection between the code receiver 30a and the terminal device 40b can be made via a serial bus such as Universal Serial Bus (USB), RS232C, or the like. The code receivers 30a and 30b are arranged in an area 24a where an illumination area 22a of the beam emitted from the code transmitter 20a and an illumination area 22b of the beam emitted from code transmitter 20b intersect.

Meanwhile, the code transmitters 20a and 20b are identical in configuration; the code receivers 30a and 30b are identical in configuration; the terminal devices 40a and 40b are identical in configuration. Accordingly, in the following description, each of them is referred to as "the code transmitter 20" or such without a corresponding suffix when collectively referred to, while each of them is referred to as "the code transmitter 20a" or such with the corresponding suffix when individually referred to.

The configuration of the code transmitter 20 is described below first.

Figure 2:
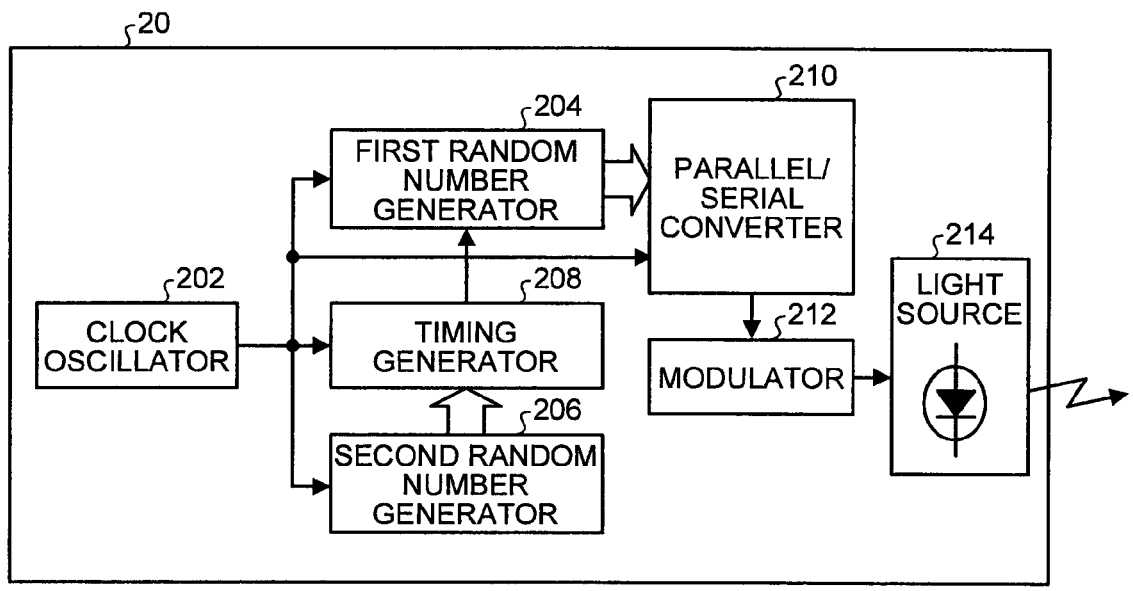
FIG. 2 is a block diagram illustrating a configuration of a code transmitter.

FIG. 2 is a block diagram illustrating a configuration the code transmitter 20.

The code transmitter 20 includes a clock oscillator 202 that generates a clock signal of a predetermined cycle, first and second random number generators 204 and 206, a timing generator 208, a parallel/serial converter 210, a modulator 212, and a light source 214. Each of the random number generators 204 and 206 can be formed of a pseudorandom number generator that generates a predetermined sequence of pseudorandom numbers.

The second random number generator 206 generates a random number when the clock signal goes high, for example, and outputs the generated random number to the timing generator 208.

When the random number output by the second random number generator 206 satisfies a predetermined condition, the timing generator 208 outputs an output command signal that directs the first random number generator 204 to output the random number generated inside the first random number generator 204. The predetermined condition is, for example, that the random number output by the second random number generator 206 is within a predetermined range of values or that the random number is a multiple of a predetermined value.

The first random number generator 204 generates a random number when the clock signal goes high, for example, and outputs the generated random number to the timing generator 208, and, upon receiving the output command signal from the timing generator 208, outputs the generated random number to the parallel/serial converter 210 in a form of 8-bit parallel data, for example.

The parallel/serial converter 210 converts the 8-bit parallel data output from the first random number generator 204 into serial data in synchronization with the clock signal and outputs the serial data to the modulator 212.

The modulator 212 modulates intensity of a beam emitted from the light source 214 according to the 8-bit serial data output by the parallel/serial converter 210 by controlling a driving current of the light source 214. With regard to modulation, asynchronous communication signals can be obtained from the serial data in such a manner that a start bit is inserted before the 8-bit serial data and a parity bit and a stop bit are inserted after the 8-bit serial data.

The light source 214 emits a beam that diverges at a predetermined beam angle. Accordingly, the single area (24a of FIG. 1) can be formed by causing the beams emitted from the two code transmitters 20a and 20b to intersect.

The light source 214 is driven by the modulator 212 to transmit the serial data (random data) based on the random number generated by the first random number generator 204 as an intensity-modulated beam. A light emitting diode (LED) that emits visible light or invisible light (e.g., infrared light) or the like can be used as the light source 214.

The code transmitter 20 configured as described above generates the random data that is the time-varying code based on the random number generated by the first random number generator 204 and transmits the random data by emitting the beam modulated with the random data from the light source 214.

The configuration of the code receiver 30 is described next.

Figure 3:
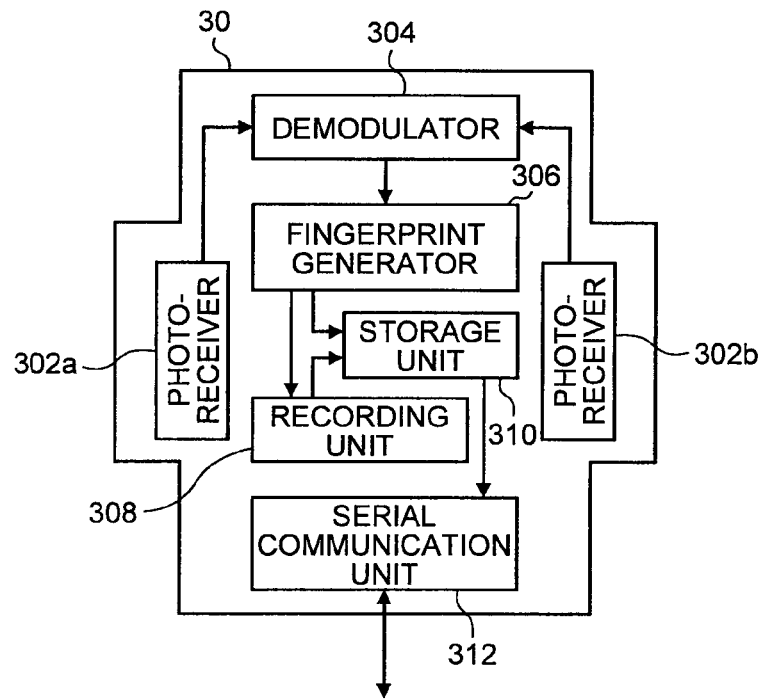
FIG. 3 is a block diagram illustrating a configuration of a code receiver.

FIG. 3 is a block diagram illustrating the configuration of the code receiver 30.

The code receiver 30 includes photo-receivers 302a and 302b, a demodulator 304, a fingerprint generator 306, a recording unit 308, a storage unit 310 made up of a RAM or the like, and a serial communication unit 312.

Figure 4:
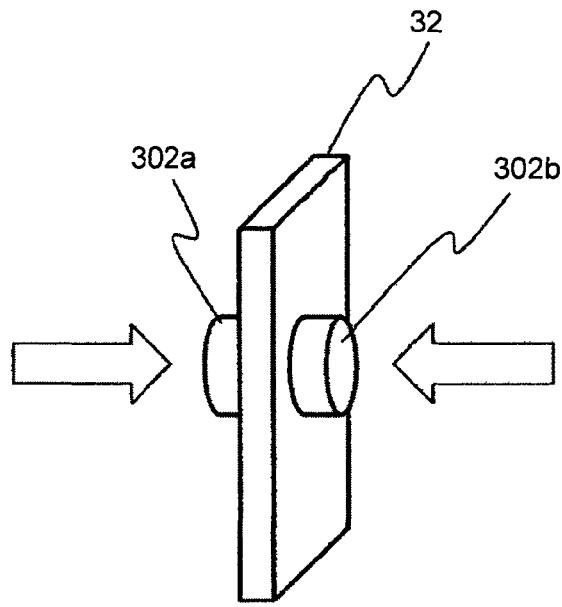
FIG. 4 is a diagram illustrating an example of arrangement of photo-receivers.

The photo-receivers 302a and 302b receive the intensity-modulated beams, which are the beams emitted from the code transmitters 20a and 20b, respectively, and convert the beams into electric signals (intensity-modulation signals). Photo-diodes, phototransistors, or the like suited for an emission wavelength of the light source 214 of the code transmitter 20 can be used as the photo-receivers 302a and 302b. In addition, the photo-receivers 302a and 302b are configured by being arranged on a front surface and a back surface, respectively, of a substrate 32 so that each of the photo-receivers 302a and 302b can separately receive one of the beams emitted from the code transmitters 20a and 20b traveling in two opposing directions. Arrows indicated in FIG. 4 denote a beam emitted from the code transmitter 20a and incident on the photo-receiver 302a and a beam emitted from the code transmitter 20b and incident on the photo-receiver 302b.

The demodulator 304 demodulates the electric signals output from the photo-receivers 302a and 302b and outputs the respective pieces of random data (8-bit data) transmitted from the code transmitters 20a and 20b accompanied with source information (information indicating from which one of the code transmitters 20a and 20b is a source of the piece of random data) to the fingerprint generator 306.

The fingerprint generator 306 stores the pieces of random data output from the demodulator 304 on a per-source basis (namely, for the code transmitter 20a and the code transmitter 20b separately) in the storage unit 310. As a result, a latest piece of random data transmitted from the code transmitter 20a and a latest piece of random data transmitted from the code transmitter 20b are consistently stored in the storage unit 310. Thereafter, the fingerprint generator 306 combines these two pieces of random data (each 8-bit) stored in the storage unit 310 to generate a fingerprint (16-bit), and outputs the fingerprint to the recording unit 308.

As a consequence of the operations described above, the fingerprint generator 306 generates a new fingerprint at a point in time where any one of the two pieces of random data transmitted from the code transmitters 20a and 20b is changed.

Meanwhile, the fingerprint can be any fingerprint so long as the fingerprint is generated based on the two pieces of random data transmitted from the code transmitters 20a and 20b and not limited to such a fingerprint of the present embodiment obtained by combining the pieces of random data but can be a logical product or a logical sum of the two pieces of random data.

In addition, timing when the fingerprint is to be generated is not limited to the point in time of the present embodiment where any one of the two pieces of random data transmitted from the code transmitters 20a and 20b is changed, but can be a point in time where both the two pieces of random data transmitted from the code transmitters 20a and 20b are changed.

Next, the recording unit 308 stores fingerprints generated by the fingerprint generator 306 in the storage unit 310 in an order in which they are generated. In addition, an oldest one of the fingerprints is deleted from the storage unit 310 when the number of the stored fingerprints exceeds a predetermined number, thereby causing the predetermined number of fingerprints to be consistently held in the storage unit 310.

In addition, the serial communication unit 312 exchanges data with the terminal device 40 via a USB or the like serial bus.

Figure 5:
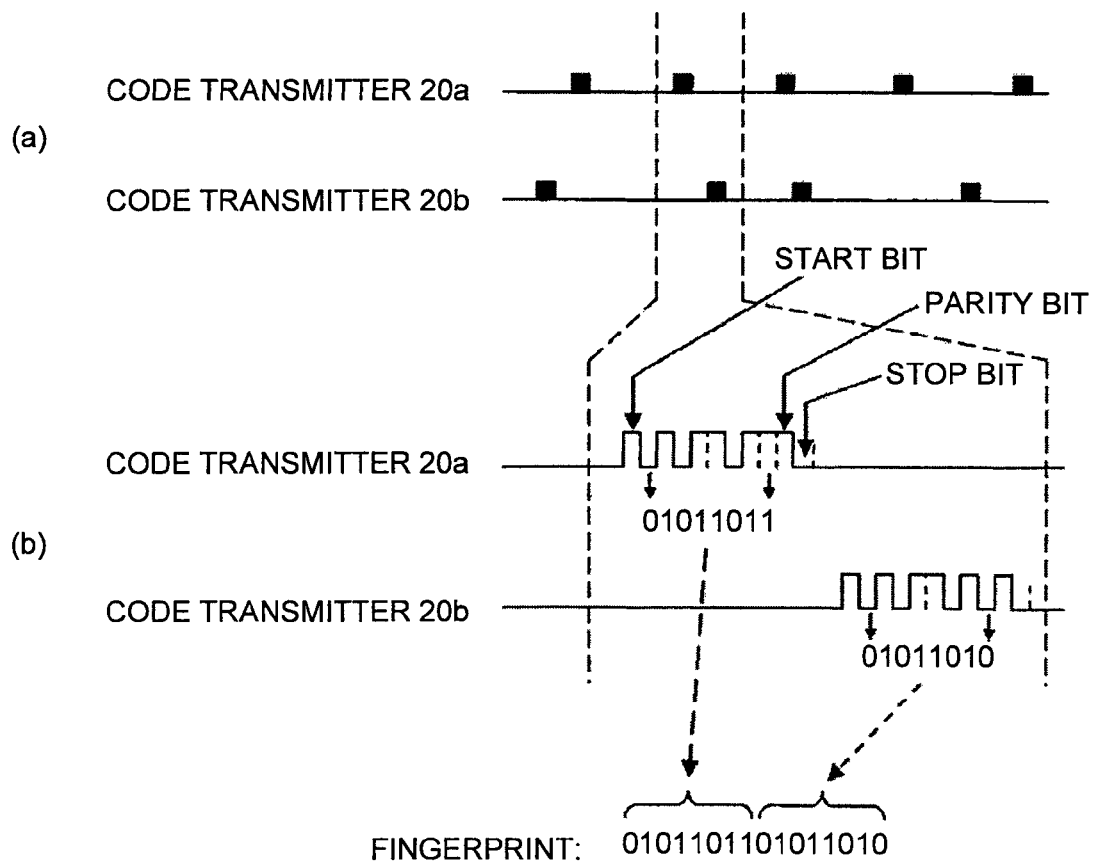
FIG. 5 illustrates an example of pieces of random data and a fingerprint.

FIG. 5 illustrates an example of the pieces of random data transmitted from the two code transmitters 20a and 20b and the fingerprint generated from the pieces of random data.

Illustrated in (a) of FIG. 5 is an example of transmission waveforms of the pieces of random data transmitted from the code transmitters 20a and 20b. Illustrated in (b) of FIG. 5 are a partially enlarged view of (a) of FIG. 5 and an example of the fingerprint.

The code transmitters 20a and 20b each transmit the piece of random data at different timings independently of each other ((a) of FIG. 5).

As illustrated in (b) of FIG. 5, these pieces of random data are transmitted asynchronously. Transmission of a single piece of random data is completed when the 8-bit random data ("01011011" from the code transmitter 20a, or "01011010" from the code transmitter 20b) preceded by the start bit ("1") (on a left end in the drawing) and followed by the parity bit and the stop bit which is at a tail end (on a right end in the drawing) has been transmitted.

The code receiver 30 receives the two pieces of random data illustrated in (b) of FIG. 5, appends the random data "01011010" from the code transmitter 20b to the random data "01011011" from the code transmitter 20a to thereby generate a 16-bit fingerprint "0101101101011010".

The configuration of the terminal device 40 is described next.

Figure 6:
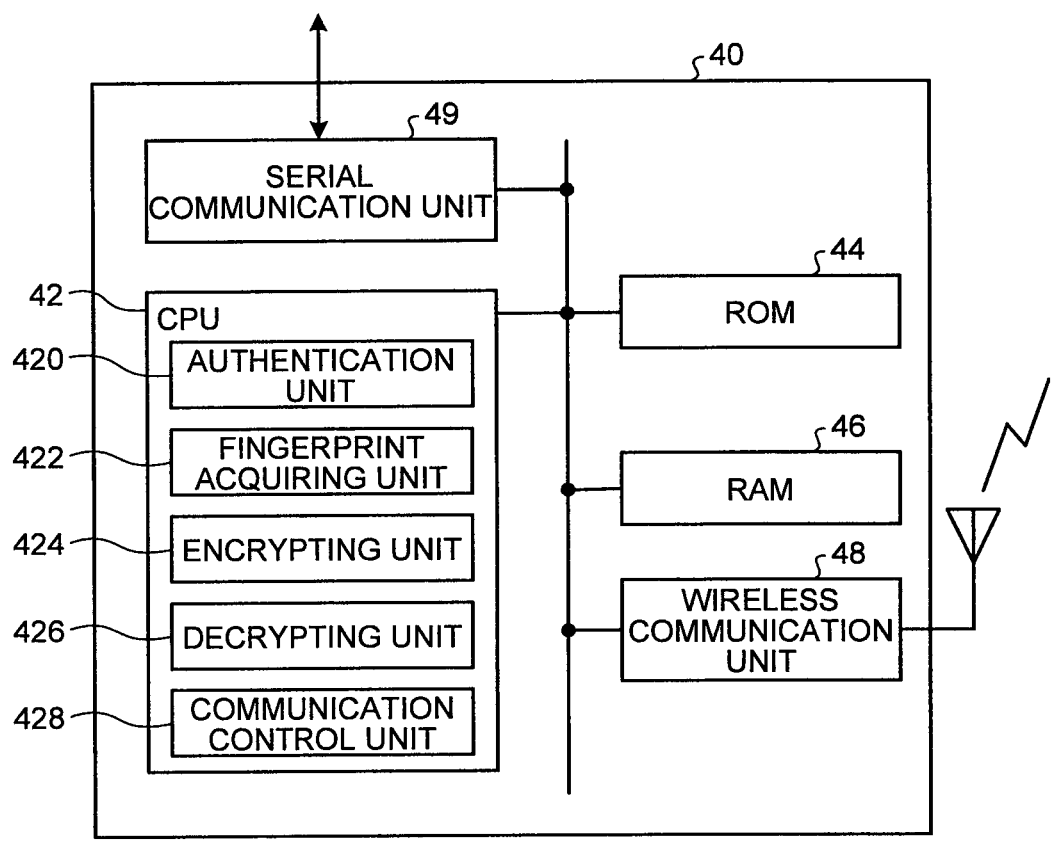
FIG. 6 is a block diagram illustrating a configuration of a terminal device.

FIG. 6 is a block diagram illustrating the configuration of the terminal device 40.

The terminal device 40 includes a computer that includes a central processing unit (CPU) 42, a read only memory (ROM) 44 to which a program is written, and a random access memory (RAM) 46 for temporarily storing data, a wireless communication unit 48, and a serial communication unit 49.

The terminal device 40 also includes an authentication unit 420, a fingerprint acquiring unit 422, an encrypting unit 424, a decrypting unit 426, and a communication control unit 428 as function implementing means that is implemented by the CPU 42 by executing computer programs. Meanwhile, the computer programs can be stored in any desired computer-readable storage medium.

The fingerprint acquiring unit 422 acquires the fingerprint stored in the storage unit 310 of the code receiver 30 connected to the terminal device 40 via the serial communication unit 49.

The communication control unit 428 transmits the acquired fingerprint and receives a fingerprint transmitted from the other terminal device 40 via the wireless communication unit 48.

The encrypting unit 424 and the decrypting unit 426 performs fingerprint encryption and fingerprint decryption, respectively, when a fingerprint is to be transmitted and received by the communication control unit 428 using an encryption key.

The authentication unit 420 compares the fingerprint acquired by the fingerprint acquiring unit 422 to the fingerprint received by the communication control unit 428 from the other terminal device 40, certifies the other terminal device 40 as a recipient with which wireless communication connection is to be established on condition that the fingerprints match, and transmits an encryption key for use in future data communication to the other terminal device 40.

In the wireless communication system having the configuration described above, when a user switches on the code transmitters 20a and 20b, the code transmitters 20a and 20b continuously output intensity-modulated beams modulated according to the piece of time-varying random data independently of each other.

Next, when the user switches on the code receivers 30a and 30b and the terminal devices 40a and 40b, the code receivers 30a and 30b acquire the pieces of random data transmitted from the code transmitters 20a and 20b, respectively, generate fingerprints based on these pieces of random data, and record the fingerprints.

Subsequently, the terminal devices 40a and 40b acquire latest fingerprints from the code receivers 30a and 30b, respectively, and transmit and receive the acquired fingerprints to and from each other each using its own encryption key α. The terminal devices 40a and 40b each authenticate the other terminal device 40a or 40b as a communications partner when they have acquired the same fingerprint, exchange their encryption keys β for use in future data exchange, and establish wireless communication connection.

Thus, the terminal devices 40a and 40b can automatically acquire and exchange fingerprints without requiring user operation, such as an input of a PIN code, and authenticate a communications partner easily and quickly to thereby establish wireless communication connection.

Figure 7:
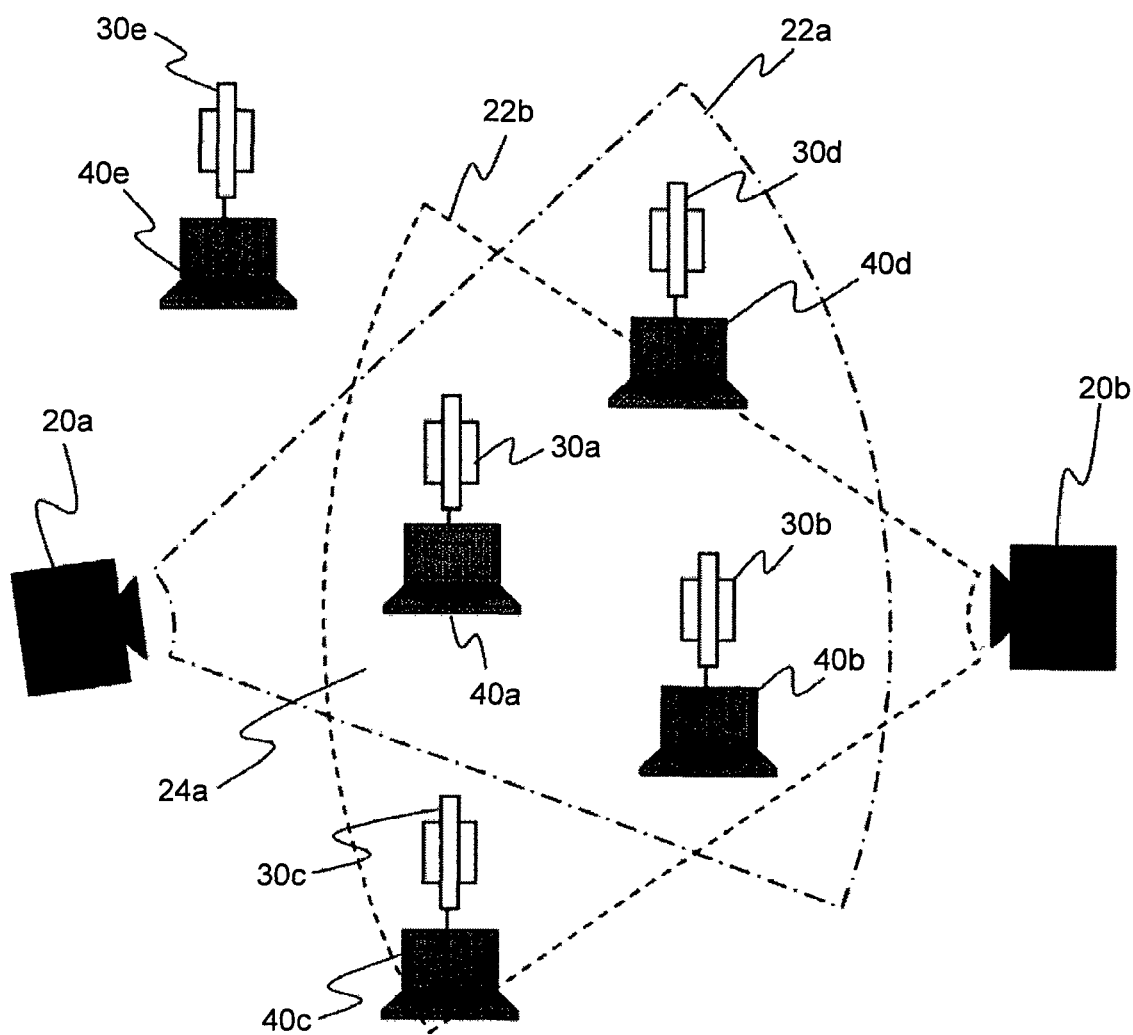
FIG. 7 is a diagram illustrating another example of arrangement of terminal devices.

Meanwhile, code receivers 30c, 30d, and 30e that, as in an example of arrangement of the terminal devices 40 illustrated in FIG. 7, are arranged outside the area 24a where the beams emitted from the code transmitters 20a and 20b intersect cannot acquire a piece of random data from any one or both of the code transmitters 20a and 20b. Accordingly, terminal devices 40c, 40d, and 40e connected to the code receivers 30c, 30d, and 30e, respectively, cannot acquire the same fingerprint as that acquired by the terminal devices 40a and 40b inside the area 24a, and therefore cannot establish communication connection with the terminal devices 40a and 40b.

As a result, wireless communication connection is established only between the terminal devices 40a and 40b that are present in the area 24a and security against the terminal devices 40c, 40d, and 40e outside the area 24a is ensured.

Therefore, even in a case where there are a plurality of meeting spaces adjacent to a wireless coverage (e.g., at distances up to 10 meters) of the terminal devices 40, it is possible to establish wireless communication connection only between the terminal devices 40 present in an authenticable and connectable physical range (namely, a single meeting space) in a condition where the physical range is explicitly confined by installing the code transmitters 20a and 20b in each of the meeting spaces and demarcating each of the meeting spaces as a range where beams emitted from these code transmitters 20a and 20b intersect.

Next, procedures for processes to be performed by the wireless communication system are described.

The processes include a fingerprint recording process in which the code receiver 30 generates and records a fingerprint and a communication connection process in which the terminal device 40 authenticates the other terminal device 40 as a communications partner based on the fingerprint generated and recorded by the code receiver 30 and establishes wireless communication connection. The procedures for the processes are individually described below.

Fingerprint Recording Process

Figure 8:
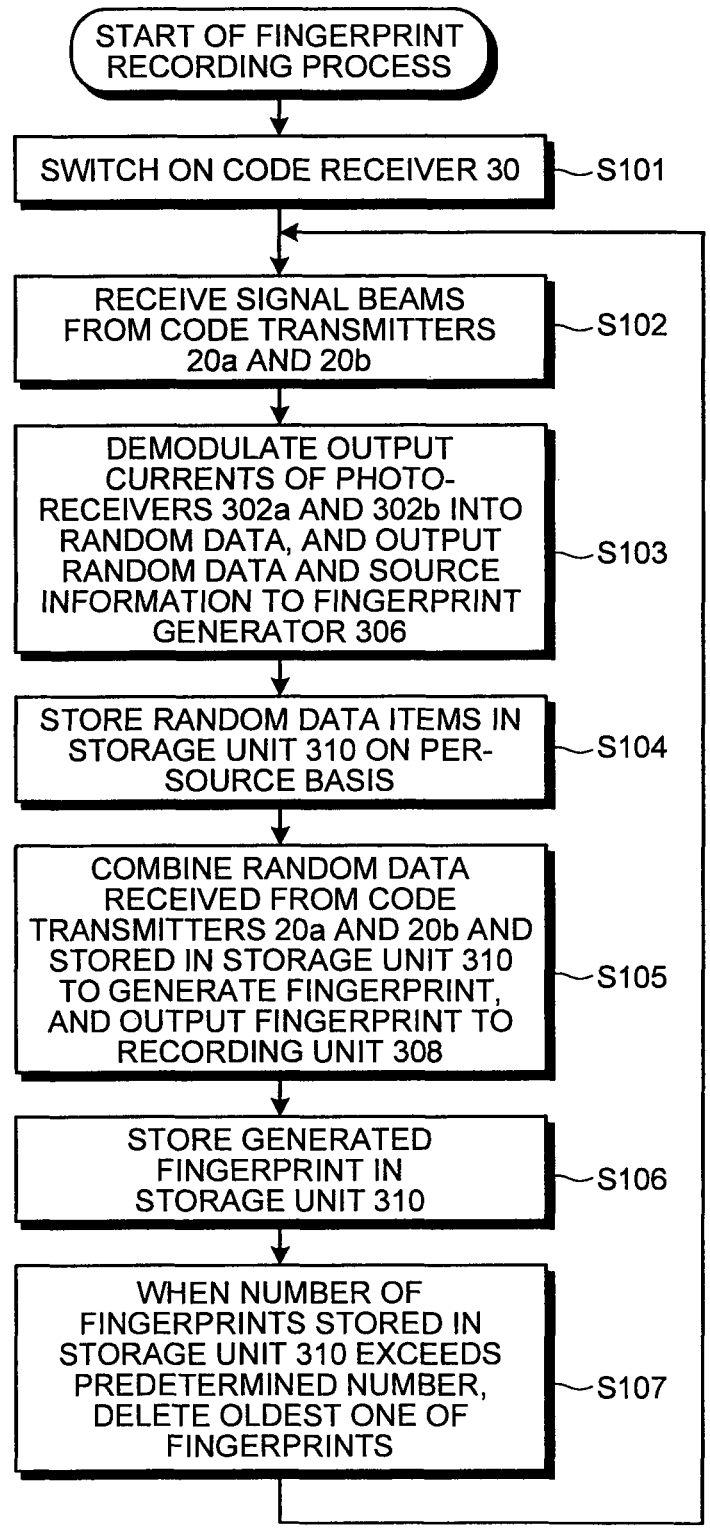
FIG. 8 is a flowchart illustrating a procedure for a fingerprint recording process.

The procedure for the fingerprint recording process to be performed by the code receiver 30 is described first according to the flowchart illustrated in FIG. 8.

When a user switches on the code receiver 30 (Step S101), the code receiver 30 causes the photo-receivers 302a and 302b to receive signal beams from the code transmitters 20a and 20b, respectively (Step S102). The demodulator 304 demodulates output currents of the photo-receivers 302a and 302b into pieces of random data and outputs the pieces of random data each accompanied with source information (information indicating which one of the code transmitters 20a and 20$b$ is a source of each of the piece of random data) to the fingerprint generator 306 (Step S103).

The fingerprint generator 306 stores the pieces of random data input from the demodulator 304 in the storage unit 310 on a per-source basis (the code transmitters 20$a$ and 20$b$) (Step S104), reads out the pieces of random data received from the code transmitters 20$a$ and 20$b$ and stored in the storage unit 310, combines these pieces of random data to generate a fingerprint, and outputs the fingerprint to the recording unit 308 (Step S105).

Subsequently, the recording unit 308 stores the fingerprint input from the fingerprint generator 306 in the storage unit 310 (Step S106). When the number of fingerprints stored in the storage unit 310 exceeds the predetermined number, the recording unit 308 deletes an oldest one of the fingerprints from the storage unit 310 (Step S107), and thereafter returns to Step S102 to repeat processing.

The process described above places the storage unit 310 in a state where the predetermined number of most-recently-generated fingerprints is consistently stored therein.

Meanwhile, this process ends when a user switches off the code receiver 30.

Communication Connection Process

A procedure for the communication connection process to be performed by the terminal device 40 is described next.

The communication connection process includes a connection request process in which the terminal device 40 transmits a connection request signal (a session request which will be described later) requesting for communication connection to the other terminal device 40, and a connection response process in which authentication and the like necessary for communication connection are performed in response to receiving a request for communication connection from the other terminal device 40.

Meanwhile, in the following description, it is assumed that the terminal device 40$a$ performs the connection request process, and, in response thereto, the terminal device 40$b$ performs the connection response process to facilitate understanding of an authentication protocol (a procedure to be performed to authenticate a communications partner) performed between the terminal devices 40.

Figure 9:
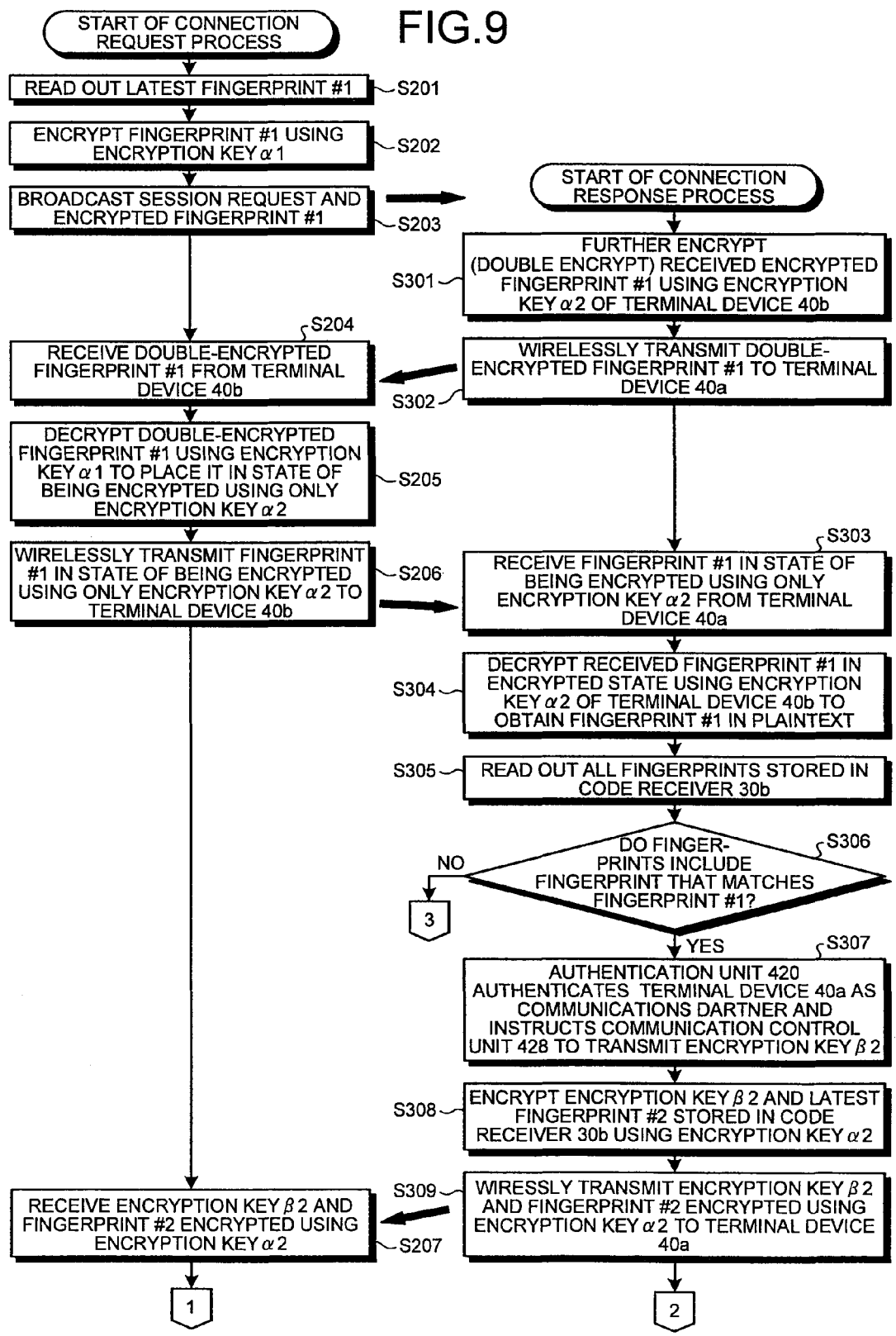
FIG. 9 is a flowchart illustrating a procedure for a communication connection process.
Figure 10:
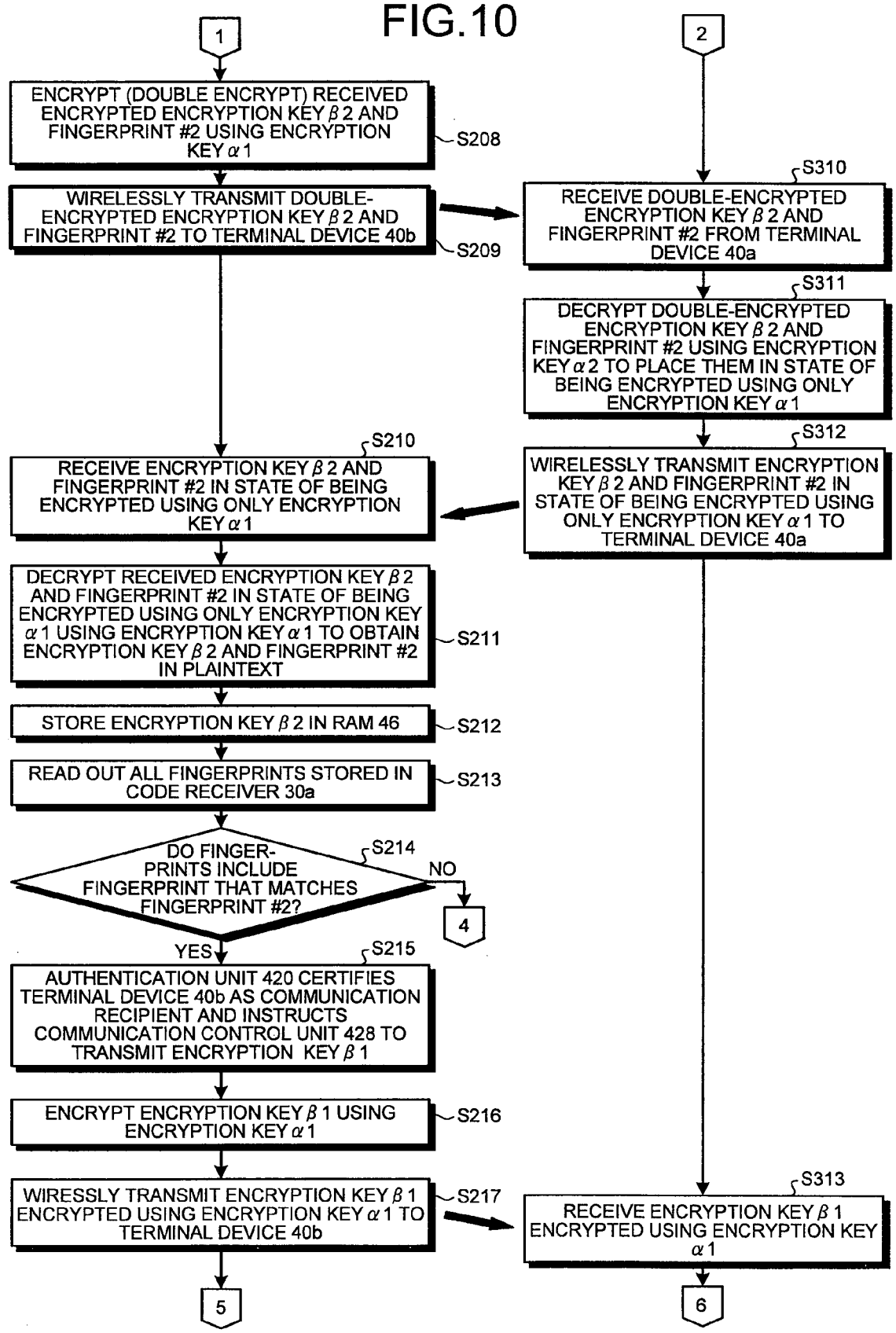
FIG. 10 is a flowchart illustrating the procedure for the communication connection process.
Figure 11:
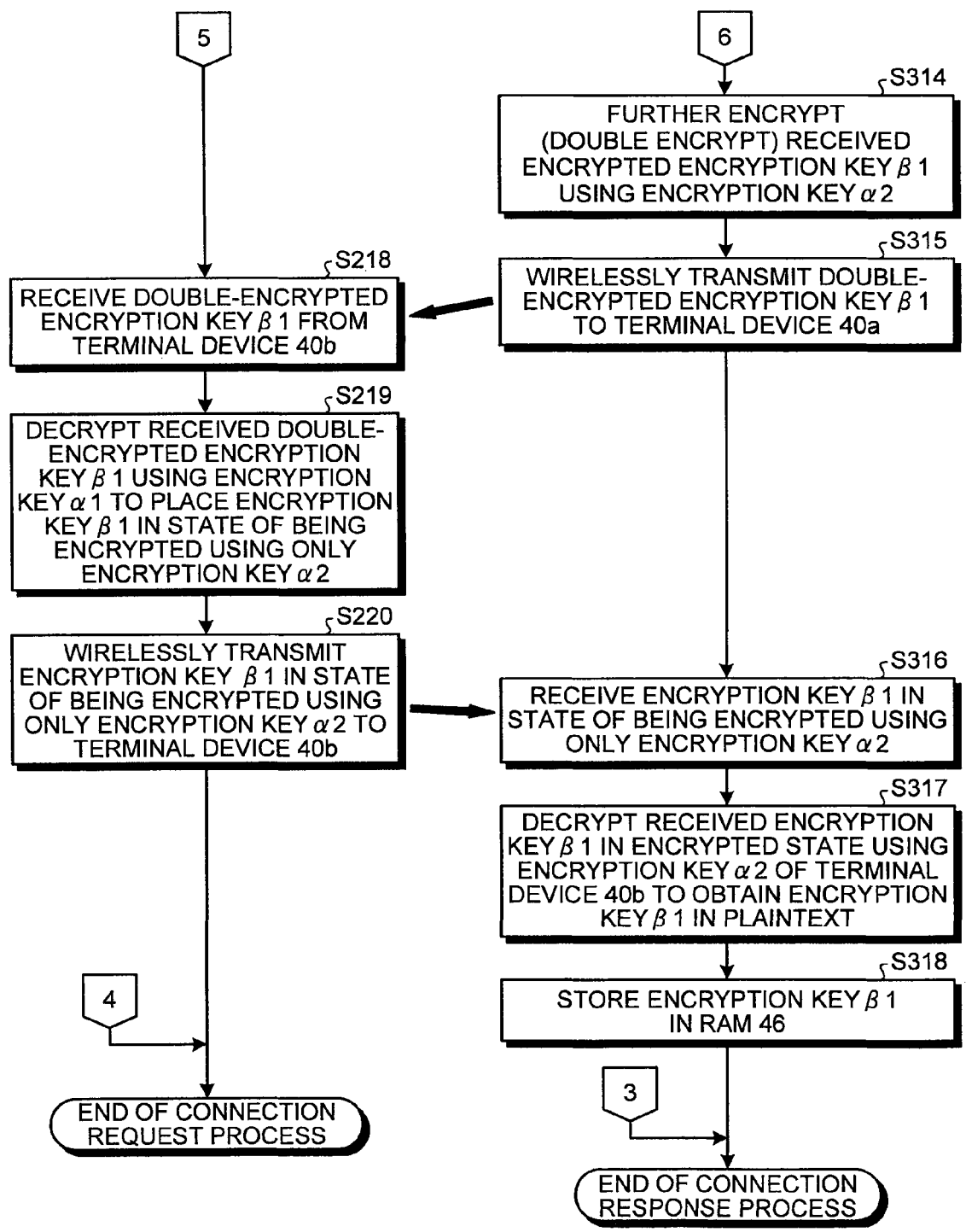
FIG. 11 is a flowchart illustrating the procedure for the communication connection process.

FIG. 9 is a flowchart illustrating the procedure for the communication connection process until when the terminal device 40$a$ receives an encryption key $\beta 2$ from the terminal device 40$b$. FIG. 10 is a flowchart illustrating the procedure for the communication connection process until when, after the terminal device 40$a$ receives the encryption key $\beta 2$ from the terminal device 40$b$, the terminal device 40$b$ receives an encryption key $\beta 1$ from the terminal device 40$a$. FIG. 11 is a flowchart illustrating the procedure for the communication connection process after the terminal device 40$b$ receives the encryption key $\beta 1$ from the terminal device 40$a$.

In FIGS. 9 to 11, the flowcharts on the left side illustrate the procedure for the connection request process to be performed by the terminal device 40$a$; the flowcharts on the right side illustrate the procedure for the connection response process to be performed by the terminal device 40$b$; arrows depicted between the right and left flowcharts indicate directions of data exchanged between the terminal devices 40$a$ and 40$b$ by wireless communication.

The procedures for the connection request process and the connection response process are described below one by one.

Communication Request Process

The procedure for the communication request process is described first according to the flowcharts illustrated on the left side in FIGS. 9 to 11.

The communication request process starts after a predetermined time interval after power-on of the terminal device 40$a$ or in response to an instruction from a user via an operating unit (not shown) of the terminal device 40$a$.

When the connection request process is started, the fingerprint acquiring unit 422 of the terminal device 40$a$ reads out from the code receiver 30 a latest fingerprint (referred to as a fingerprint #1) of the fingerprints stored in the storage unit 310 of the code receiver 30 via the serial communication unit 49 (Step S201). The encrypting unit 424 encrypts the read-out fingerprint #1 using an encryption key (denoted by $\alpha 1$) unique to the terminal device 40$a$ (Step S202).

The communication control unit 428 of the terminal device 40$a$ broadcasts a session request, which is a connection request signal requesting for communication connection, and the encrypted fingerprint #1 using the wireless communication unit 48 next (Step S203).

In response thereto, the terminal device 40$b$ receives the session request and the encrypted fingerprint #1 and starts the connection response process, in which the terminal device 40$b$ further encrypts (double encrypts) the received encrypted fingerprint #1 using an encryption key (denoted by $\alpha 2$) of the terminal device 40$b$ and transmits the fingerprint to the terminal device 40$a$ through Steps S301 and S302 of FIG. 9, which will be described later.

Next, the communication control unit 428 of the terminal device 40$a$ receives the double-encrypted fingerprint transmitted from the terminal device 40$b$ (S204). The decrypting unit 426 of the terminal device 40$a$ decrypts the double-encrypted fingerprint using the encryption key $\alpha 1$ to place it in a state of being encrypted using only the encryption key $\alpha 2$ (Step S205). Subsequently, the communication control unit 428 causes the wireless communication unit 48 to wirelessly transmit the fingerprint #1 in the state of being encrypted using only the encryption key $\alpha 2$ to the terminal device 40$b$ (Step S206).

In response thereto, the terminal device 40$b$ performs processing of Steps S303 to S309 of FIG. 9, which will be described later. More specifically, after receiving the fingerprint #1 in the state of being encrypted using only the encryption key $\alpha 2$ transmitted from the terminal device 40$a$, the terminal device 40$b$ decrypts it using the encryption key $\alpha 2$ of the terminal device 40$b$ to obtain the fingerprint #1 in plaintext (not encrypted). When a fingerprint that matches the decrypted fingerprint #1 is stored in the storage unit 310 of the code receiver 30$b$ connected to the terminal device 40$b$, the terminal device 40$b$ encrypts the encryption key (denoted by $\beta 2$) for use in future communication and a fingerprint #2, which is a latest one of the fingerprints stored in the storage unit 310 of the code receiver 30$b$, using the encryption key $\alpha 2$ of the terminal device 40$b$, and wirelessly transmits the encryption key $\beta 2$ and the fingerprint #2 to the terminal device 40$a$.

Next, the communication control unit 428 of the terminal device 40$a$ receives the encrypted encryption key 32 and the fingerprint #2 transmitted from the terminal device 40$b$ (Step S207), and proceeds to Step S208 of FIG. 10.

A description is given below according to the flowchart illustrated on the left side in FIG. 10.

Subsequently, the encrypting unit 424 further encrypts (double encrypts) the encrypted encryption key 32 and the encrypted fingerprint #2 using the encryption key $\alpha 1$ (Step S208) of the terminal device 40$a$. The communication control unit 428 wirelessly transmits the double-encrypted encryption key $\beta 2$ and the double-encrypted fingerprint #2 to the terminal device 40$b$ via the wireless communication unit 48 (Step S209).

In response thereto, the terminal device 40b receives the double-encrypted encryption key β2 and the fingerprint #2, decrypts them using its own encryption key α2, and wirelessly transmits the encryption key β2 and the fingerprint #2 in a state of being encrypted using only the encryption key α1 to the terminal device 40a through Steps S310 to S312 of FIG. 10, which will be described later.

Next, the communication control unit 428 of the terminal device 40a receives the encryption key β2 and the fingerprint #2 in the state of being encrypted using only the encryption key α1 transmitted from the terminal device 40b (Step S210). The decrypting unit 426 decrypts the received encryption key β2 and the fingerprint #2 in the state of being encrypted using only the encryption key α1 using the encryption key α1 of the terminal device 40a to obtain the encryption key β2 and the fingerprint #2 in plaintext (Step S211). Furthermore, the communication control unit 428 stores the encryption key β2 in the RAM 46 (Step S212).

Next, the fingerprint acquiring unit 422 of the terminal device 40a reads out all fingerprints stored in the code receiver 30a (Step S213). The authentication unit 420 determines whether the read-out fingerprints include a fingerprint that matches (Step S214). When the fingerprints include a fingerprint that matches the fingerprint #2 (Yes at Step S214), the authentication unit 420 certifies the terminal device 40b which is a source of the fingerprint #2 as a communications partner, and instructs the communication control unit 428 to transmit the encryption key β1 for use in communication to the terminal device 40a after establishment of communication connection to the terminal device 40b (Step S215). On the other hand, when the fingerprints do not include a fingerprint that matches (No at Step S214), a communication response process ends without certifying the terminal device 40b as a communications partner.

Subsequently, the communication control unit 428 causes the encrypting unit 424 to encrypt the encryption key β1 for use in communication to the terminal device 40a after establishment of communication connection using the encryption key α1 of the terminal device 40a (Step S216), thereafter causes the wireless communication unit 48 to wirelessly transmit the encryption key β1 encrypted using the encryption key α1 to the terminal device 40b (Step S217), and proceeds to step S218 of FIG. 11.

In response thereto, the terminal device 40b receives the encryption key β1 encrypted using the encryption key α1, further encrypts (double encrypts) the encryption key β1 using its own encryption key α2, and wirelessly transmits the double-encrypted encryption key β1 to the terminal device 40a through Step S313 of FIG. 10 and Steps S314 and S315 of FIG. 11, which will be described later.

A description is given below according to the flowchart illustrated on the left side in FIG. 11.

Next, the communication control unit 428 of the terminal device 40a receives the double-encrypted encryption key β1 transmitted from the terminal device 40b (Step S218). The decrypting unit 426 decrypts the received double-encrypted encryption key β1 using the encryption key α1 to place the encryption key β1 in a state of being encrypted using only the encryption key α2 (Step S219). The communication control unit 428 causes the wireless communication unit 48 to wirelessly transmit the encryption key β1 in the state of being encrypted using only the encryption key α2 to the terminal device 40b (Step S220), at which the connection request process ends.

In response thereto, the terminal device 40b receives the double-encrypted encryption key β1 in the state of being encrypted using only the encryption key α2, decrypts the encryption key β1 using its own encryption key α2 to obtain the encryption key β1 in plaintext, and thereafter stores the encryption key β1 in the RAM 46 through Steps S316 to S318 of FIG. 11, which will be described later. The communication response process performed by the terminal device 40b is thus completed and communication connection between the terminal devices 40a and 40b is established. More specifically, the terminal devices 40a and 40b exchange data using their own encryption keys β1 and β2 by encrypting and decrypting data using the encryption key β2 for data transmission from the terminal device 40b to the terminal device 40a and encrypting and decrypting data using the encryption key β1 for data transmission from the terminal device 40a to the terminal device 40b.

Communication Response Process

The procedure for the communication response process is described next according to the flowcharts illustrated on the right side in FIGS. 9 to 11. As described above, it is assumed in the following description that the communication response process is performed by the terminal device 40b in response to the connection request process performed by the terminal device 40a.

The communication response process starts when the communication control unit 428 of the terminal device 40b receives the session request and the encrypted fingerprint #1 broadcasted from the terminal device 40a (Step S203 of FIG. 9).

When the connection response process is started, the encrypting unit 424 further encrypts (double encrypts) the encrypted fingerprint #1 received by the communication control unit 428 using the encryption key α2 of the terminal device 40b (Step S301). The communication control unit 428 wirelessly transmits the double-encrypted fingerprint #1 to the terminal device 40a via the wireless communication unit 48 (Step S302).

Next, the communication control unit 428 of the terminal device 40b receives the fingerprint #1 in the state of being encrypted using only the encryption key α2 transmitted from the terminal device 40a at Step S206 of FIG. 9 (Step S303). The decrypting unit 426 decrypts the fingerprint #1 in the encrypted state using the encryption key α2 of the terminal device 40b to obtain the fingerprint #1 in plaintext (Step S304).

Subsequently, the fingerprint acquiring unit 422 of the terminal device 40b reads out all the fingerprints stored in the code receiver 30b (Step S305). The authentication unit 420 determines whether the read-out fingerprints include a fingerprint that matches the fingerprint #1 (Step S306). When the fingerprints include a fingerprint that matches (Yes at Step S306), the authentication unit 420 certifies the terminal device 40a which is a source of the fingerprint #1 as a communications partner, and instructs the communication control unit 428 to transmit the encryption key β2 for use in communication to the terminal device 40b after establishment of communication connection to the terminal device 40a (Step S307). On the other hand, when the fingerprints do not include a fingerprint that matches (No at Step S306), the communication response process ends without certifying the terminal device 40a as a communications partner.

Next, the communication control unit 428 of the terminal device 40b causes the encrypting unit 424 to encrypt the encryption key β2 for use in communication to the terminal device 40b after establishment of communication connection and a latest one (referred to as the fingerprint #2) of the fingerprints stored in the code receiver 30b using the encryption key α2 of the terminal device 40b (Step S308). The communication control unit 428 wirelessly transmits the encrypted encryption key β2 and the fingerprint #2 to the terminal device 40a via the wireless communication unit 48 (Step S309), and proceeds to Step S310 of FIG. 10.

A description is given below according to the flowchart illustrated on the right side in FIG. 10.

Subsequently, the communication control unit 428 of the terminal device 40b receives the encryption key β2 and the fingerprint #2 in the state of being double-encrypted using the encryption keys α1 and α2 transmitted from the terminal device 40a at Step S209 of FIG. 10 (Step S310). The decrypting unit 426 decrypts the encryption key β2 and the fingerprint #2 in the state of being double-encrypted using the encryption key α2 of the terminal device 40b to obtain the encryption key β2 and the fingerprint #2 in the state of being encrypted using only the encryption key α1 (Step S311). Subsequently, the communication control unit 428 wirelessly transmits the encryption key β2 and the fingerprint #2 in the state of being encrypted using only the encryption key α1 to the terminal device 40a via the wireless communication unit 48 (Step S312).

Next, the communication control unit 428 of the terminal device 40b receives the encryption key β1, which is encrypted using the encryption key α1, transmitted from the terminal device 40a at Step S217 of FIG. 10 (Step S313), and proceeds to Step S313 of FIG. 11.

A description is given below according to the flowchart illustrated on the right side in FIG. 11.

Subsequently, the encrypting unit 424 of the terminal device 40b further encrypts (double encrypts) the encrypted encryption key β1 received at Step S313 of FIG. 10 using the encryption key α2 of the terminal device 40b (Step S314). The communication control unit 428 wirelessly transmits the double-encrypted encryption key in to the terminal device 40a via the wireless communication unit 48 (Step S315).

Next, the communication control unit 428 of the terminal device 40b receives the encryption key β1 in the state of being encrypted using only the encryption key α2 transmitted from the terminal device 40a at Step S220 of FIG. 11 (Step S316). The decrypting unit 426 decrypts the encryption key β1 in the encrypted state using the encryption key α2 of the terminal device 40b to obtain the encryption key β1 in plaintext (Step S317). After the obtained encryption key β1 in plaintext is stored in the RAM 46 (Step S318), the connection response process ends.

Next, a wireless communication system according to a second embodiment of the present invention is described.

In the wireless communication system, the code transmitters 20 of the wireless communication system according to the first embodiment are installed in advance in a meeting room or the like as parts of existing indoor illuminating devices.

According to the present embodiment, it is not necessary to additionally install the code transmitters 20 in a place, such as a meeting room, where temporary connection authentication is required; each user can only bringing the terminal device 40 to which the code receiver 30 is connected into a meeting room or the like to establish wireless communication connection with the other terminal device 40 in the same meeting room.

Figure 12A:
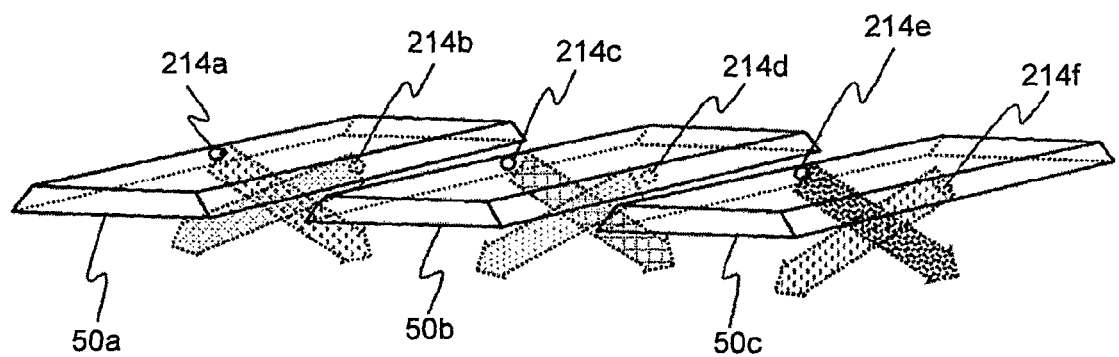
FIG. 12A illustrates an example of installation of code transmitters according to a second embodiment.
Figure 12B:
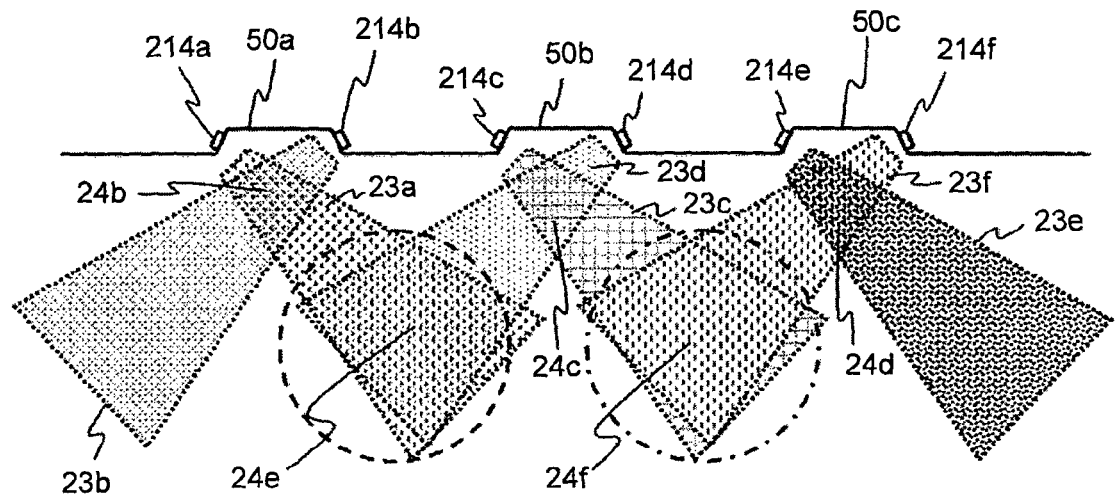
FIG. 12B illustrates the example of installation of code transmitters according to the second embodiment.

FIGS. 12A and 12B illustrate an example of installation of the code transmitters 20 in the wireless communication system according to the second embodiment of the present invention.

FIG. 12A is a diagram illustrating an example in which the light sources 214 of the code transmitters 20 are arranged in indoor illuminating devices. FIG. 12B is a diagram illustrating a wireless communication area (area where wireless communication connection is to be established) formed by arrangement of the light sources 214 illustrated in FIG. 12A.

In FIG. 12A, light sources 214a and 214b, 214c and 214d, and 214e and 214f are arranged in three indoor illuminating devices 50a, 50b, and 50c, respectively, which are fluorescent lamps, for example, on both widthwise sides of the indoor illuminating devices 50a, 50b, and 50c at substantially centers of inclined inner-side surface portions (light reflection surfaces) extending along a longitudinal direction. Each of these light sources 214a to 214f is a part of one of the code transmitters 20 that are independent of each other. Meanwhile, constituents (not shown) of the code transmitters 20 other than the light sources 214a to 214f may be arranged in close vicinity of the light sources 214a to 214f or remotely arranged at one location together.

FIG. 12B is a diagram illustrating the indoor illuminating devices 50a, 50b, and 50c illustrated in FIG. 12A and a space stretched therebelow.

Illumination areas 23a to 23f of beams emitted from the light sources 214a to 214f are provided in the space stretched below the indoor illuminating devices 50a, 50b, and 50c. An area 24b, an area 24c, and an area 24d where the illumination areas 23a and 23b, the illumination areas 23c and 23d, and the illumination areas 23e and 23f intersect, respectively, are provided in spaces immediately below the indoor illuminating devices 50a, 50b, and 50c.

Furthermore, an area 24e where the illumination areas 23a and 23d intersect and an area 24f where the illumination areas 23c and 23f intersect are provided in spaces below the areas 24b to 24d.

Each of the areas 24e and 24f among the areas 24b to 24f can be assigned as a wireless communication area as an area having a range that is sufficiently wide for holding a meeting or the like therein, for example.

Meanwhile, in the example illustrated in FIGS. 12A and 12B, a configuration in which the light sources 214 of the code transmitters 20 are attached to portions of light reflection plates of the indoor illuminating devices 50 is employed; however, the configuration is not limited thereto. For example, in a case where LED illuminating devices are used as the indoor illuminating devices 50, LED light sources used as the indoor illuminating devices 50 themselves can be used as the light sources 214 of the code transmitters 20.

Next, a wireless communication system according to a third embodiment of the present invention is described.

This wireless communication system uses, in contrast to the wireless communication system according to the first embodiment that includes the two code transmitters 20 (20a and 20b of FIG. 1), three or more the code transmitters 20. The code transmitters 20 are arranged so as to surround an area (wireless communication area) where wireless communication connection is to be established and in such a manner that illumination beams from all the code transmitters 20 intersect in the area.

Furthermore, the code receiver 30 causes the two photoreceivers 302a and 302b to receive pieces of random data transmitted from the three or more code transmitters 20 and generates a fingerprint based on at least two pieces of random data.

According to the present embodiment, the code transmitters 20 are arranged so as to surround the wireless communication area. Accordingly, it is possible to indicate the range where wireless communication is established in a visually easy-to-know manner. More specifically, the code transmitters 20 serve as landmarks indicating a range of a "security zone" where security-provided wireless communication can be carried out through connection authentication using the fingerprint. Users can perform communication connection with feeling of security. Meanwhile, it is possible to further increase an effect as the landmarks of the "security zone" by arranging each of the code transmitters 20 as being attached to a movable support unit, e.g., a self-standable stand.

Figure 13:
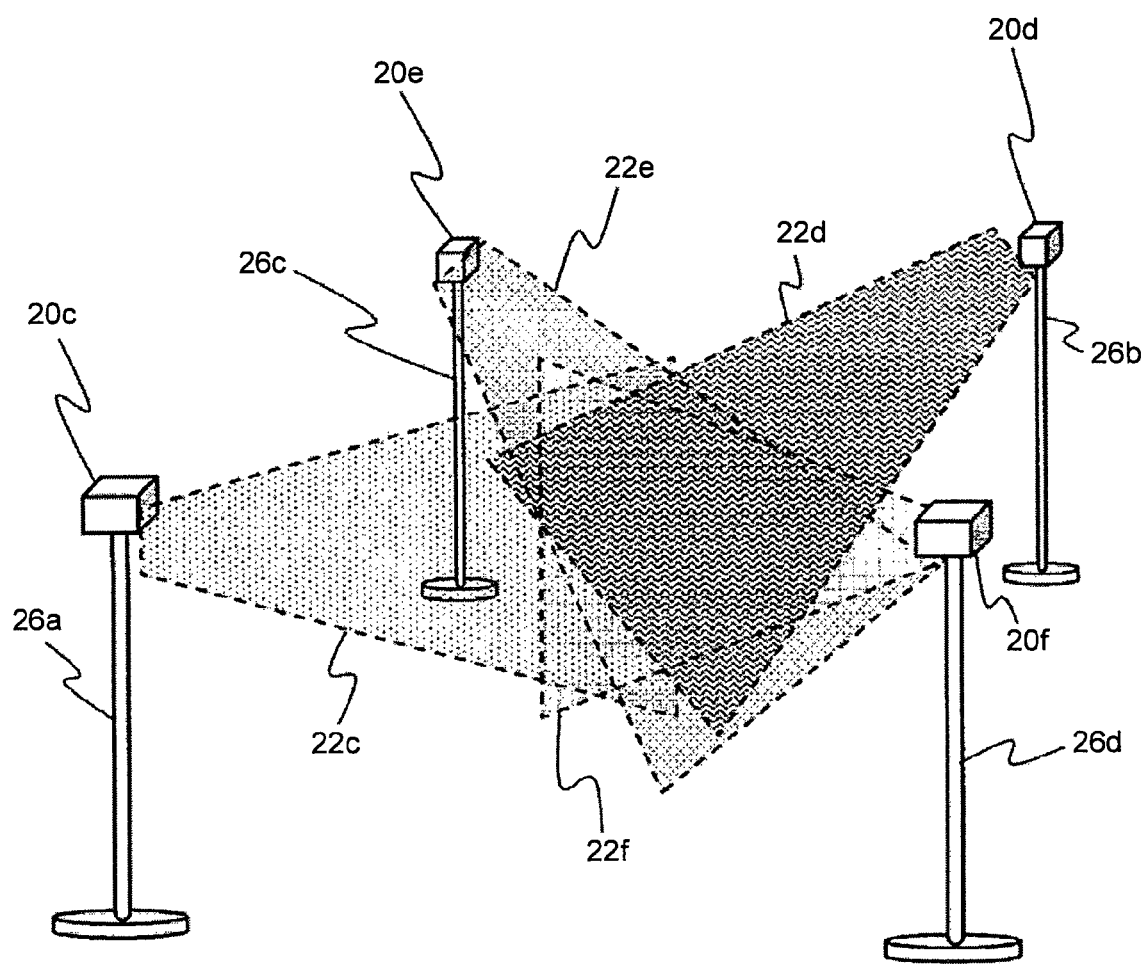
FIG. 13 is a diagram illustrating an example of installation of code transmitters according to a third embodiment.

FIG. 13 is a diagram illustrating an example of installation of the code transmitters 20 in the wireless communication system according to the third embodiment of the present invention.

In FIG. 13, four code transmitters 20c to 20f are attached to self-standable stands 26a to 26d, respectively. Furthermore, the code transmitters 20c to 20f are arranged so as to surround an area where wireless communication is to be established and in such a manner that illumination areas 22c to 22f of all the code transmitters 20c to 20f intersect in the area.

Figure 14:
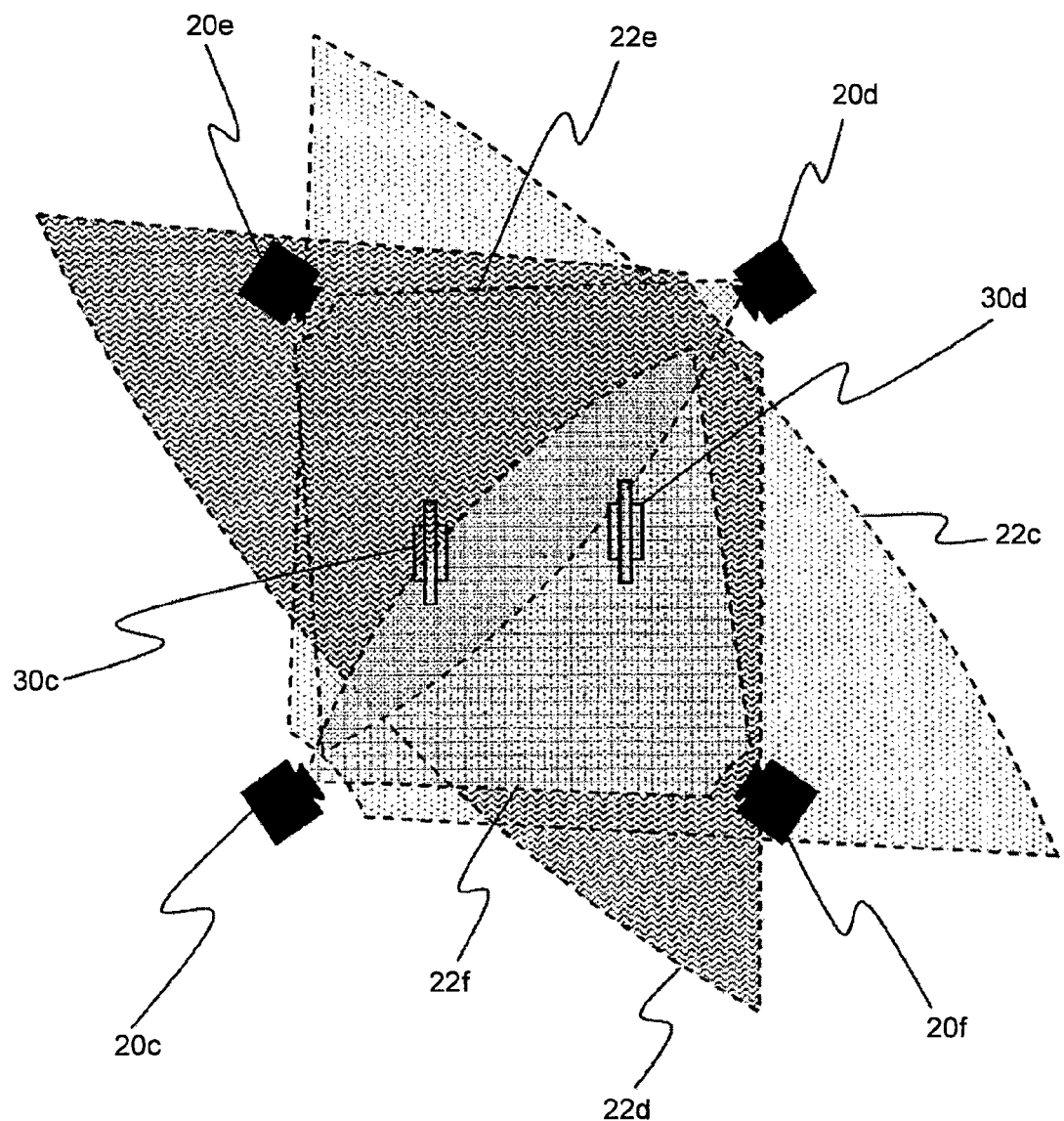
FIG. 14 is a diagram illustrating an example of arrangement of code receivers according to the third embodiment.

FIG. 14 is a diagram illustrating an example of arrangement of the code receivers 30 in the area surrounded by the code transmitters 20c to 20f illustrated in FIG. 13.

FIG. 14 is a plan view of the area. The two code receivers 30c and 30d are arranged in the area surrounded by the code transmitters 20c to 20f.

Each of users of the code receivers 30c and 30d can adjust an orientation of the substrate 32 (FIG. 4), which is provided in each of the code receivers 30c and 30d and to which the two photo-receivers 302a and 302b are attached, so that the code receivers 30c and 30d receive at least two same pieces of random data from the code transmitters 20c to 20f. This allows the code receivers 30c and 30d to generate a same fingerprint, and accordingly wireless communication connection can be established between the terminal device 40 (not shown) connected to the code receiver 30c and the terminal device 40 (not shown) connected to the code receiver 30d.

Next, a wireless communication system according to a fourth embodiment of the present invention is described.

This system is configured in such a manner that the wireless communication system according to the third embodiment includes a code receiver including four photo-receivers arranged so as to be capable of receiving beams coming from four orthogonal directions and the terminal device 40 connected to the code receiver. In this system, at least one of the two terminal devices 40 that establish wireless communication connection is connected to the code receiver including the four photo-receivers.

In the wireless communication system according to the third embodiment, the code receivers 30c and 30d cannot generate a same fingerprint when the orientation of the substrate 32 (FIG. 4) provided in each of the code receivers 30c and 30d is non-adjustable in such a situation where the orientations of the substrates 32 (FIG. 4) provided in the code receivers 30c and 30d are mutually orthogonal, the code receiver 30c receives only illumination beams from the code transmitters 20c and 20d, and the code receiver 30d receives only illumination beams from the code transmitters 20e and 20f in FIG. 14, for example.

In contrast, in the present embodiment, the code receiver including the four photo-receivers is connected to the at least one of the two terminal devices 40 that carry out wireless communication connection. The code receiver including the four photo-receivers can receive all the illumination beams from the code transmitters 20c to 20f, and therefore can generate a fingerprint based on every combination of two pieces of random data of four pieces of random data transmitted from the code transmitters 20c to 20f.

Accordingly, even in a case where the code receiver 30 is capable of illumination beams from only two code transmitters (e.g., the code transmitters 20c and 20d) of the code transmitters 20c to 20f, the code receiver including the four photo-receivers can generate a same fingerprint as a fingerprint generated by the code receiver 30 without exception. As a result, even in a case where a user cannot adjust an orientation in which the code receiver 30 is installed, wireless communication connection can be established between the terminal device 40 connected to the code receiver 30 and the terminal device 40 connected to the code receiver including the four photo-receivers.

Figure 15:
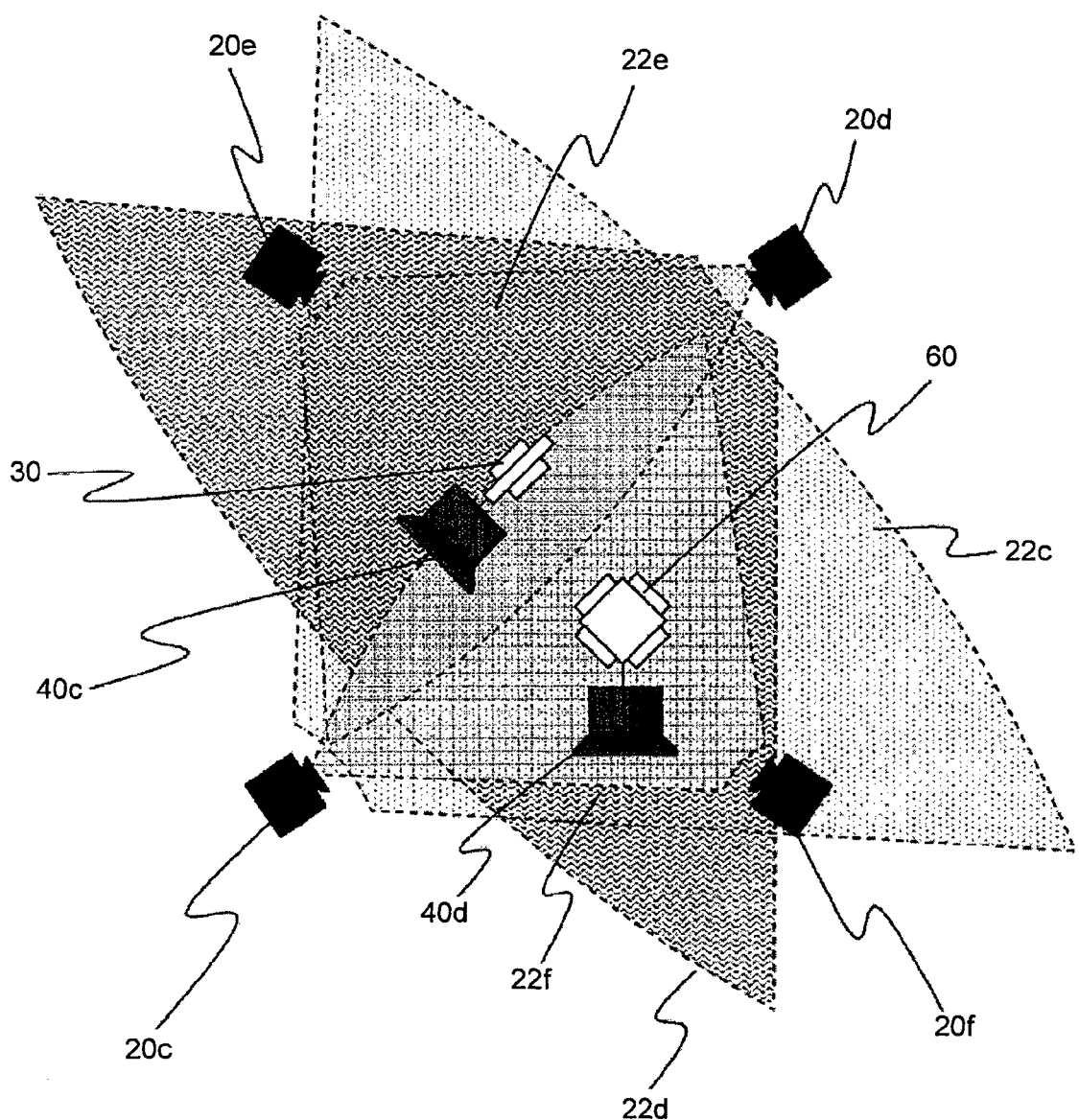
FIG. 15 is a diagram illustrating a configuration of a wireless communication system according to a fourth embodiment.

FIG. 15 is a diagram illustrating a configuration of the wireless communication system according to the fourth embodiment of the present invention.

This wireless communication system includes the code transmitters 20c to 20f arranged so as to surround the area where wireless communication is to be established, the code receiver 30 arranged in the area where beams emitted from the code transmitters 20c to 20f intersect, a code receiver 60 including the four photo-receivers, and the terminal device 40c and the terminal device 40d connected to the code receiver 30 and the code receiver 60, respectively.

Figure 16:
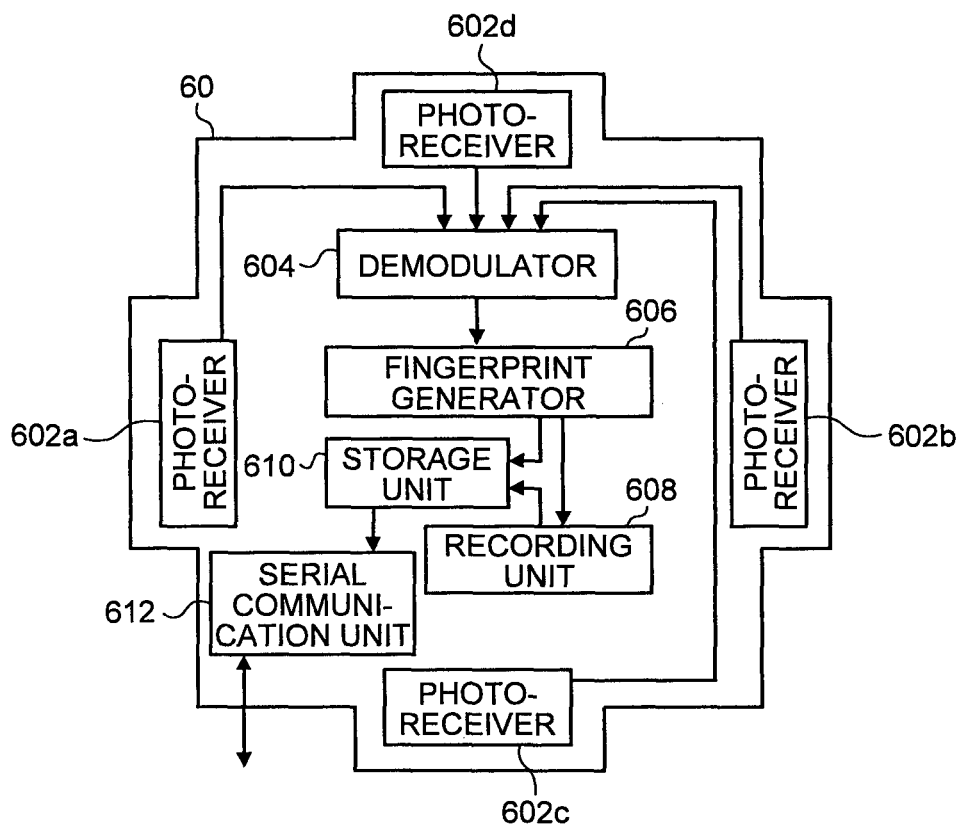
FIG. 16 is a block diagram illustrating a configuration of a code receiver according to the fourth embodiment.

FIG. 16 is a block diagram illustrating the configuration of the code receiver 60.

The code receiver 60 includes four photo-receivers 602a, 602b, 602c, and 602d, a demodulator 604, a fingerprint generator 606, a recording unit 608, a storage unit 610 made of up a RAM or the like, and a serial communication unit 612.

The photo-receivers 602a to 602d receive the intensity-modulated beams, which are beams emitted from the code transmitters 20c to 20f, respectively, and convert the beams into electric signals (intensity-modulation signals). Photodiode, phototransistors, or the like suited for an emission wavelength of the light source 214 of the code transmitter 20 can be used as the photo-receivers 602a to 602d.

Figure 17:
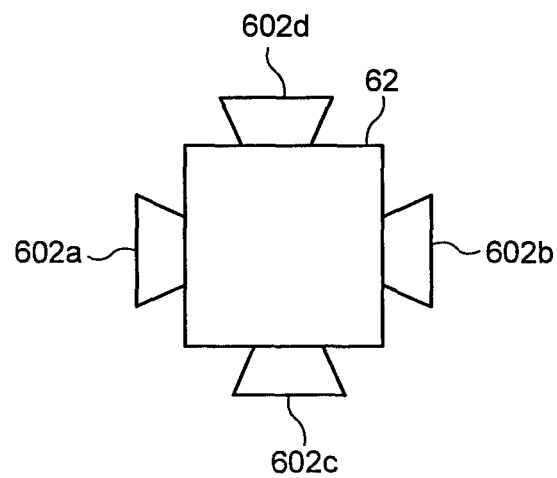
FIG. 17 is a diagram illustrating an example of arrangement of photo-receivers according to the fourth embodiment.

FIG. 17 is a diagram illustrating an example of arrangement of the photo-receivers 602a to 602d.

The photo-receivers 602a to 602d are arranged on four side surface portions, respectively, of a rectangular solid block 62 so that the photo-receivers 602a to 602d can receive beams from mutually-orthogonal four directions.

The demodulator 604 demodulates the electric signals output from the photo-receivers 602a to 602d and outputs each piece of random data (8-bit data) transmitted from the code transmitters 20c to 20f accompanied with source information (information indicating from which one of the code transmitters 20c to 20f is a source of the piece of random data) to the fingerprint generator 606.

The fingerprint generator 606 stores the pieces of random data output from the demodulator 604 on a per-source basis (namely, for each of the code transmitters 20c to 20f separately) in the storage unit 610. Thus, the latest pieces of random data transmitted from the code transmitters 20c to 20f are consistently stored in the storage unit 610. Thereafter, the fingerprint generator 606 generates all fingerprints, each of which is formed by extracting arbitrary two pieces of random data from the pieces of random data transmitted from the code transmitters 20c to 20f and stored in the storage unit 610 and combining them, and outputs the fingerprints to the recording unit 608.

As a result of the operations described above, the fingerprint generator 606 generates a new fingerprint at a point in time where any one of the pieces of random data transmitted from the code transmitters 20c to 20f is changed.

Meanwhile, timing when the fingerprint is to be generated is not limited to the point in time of the present embodiment where any one of the pieces of random data transmitted from the code transmitters 20c to 20f is changed, but can be a point in time where all the pieces of random data transmitted from the code transmitters 20c to 20f are changed.

Next, the recording unit 608 stores fingerprints generated by the fingerprint generator 606 in the storage unit 610 in an order in which they are generated. In addition, an oldest one of the fingerprints is deleted from the storage unit 610 when the number of the stored fingerprints exceeds a predetermined number, thereby causing the predetermined number of fingerprints to be consistently held in the storage unit 610.

In addition, the serial communication unit 612 exchanges data with the terminal device 40 via a USB or the like serial bus.

Next, a wireless communication system according to a fifth embodiment of the present invention is described.

This system is configured in a manner such that the wireless communication unit 48 of the terminal device 40 in the wireless communication systems according to the first to fourth embodiments carries out wireless communication by what is called ultra wideband (UWB) wireless using a bandwidth of 500 MHz or more or a bandwidth of 20% of a center frequency or more.

UWB is a wireless communication scheme defined by an output voltage limited to small-distance communication and appropriate for large-amount-data communication in a situation free from interference with another wireless device that uses a same frequency range. According to the present embodiment, the terminal device 40 includes the wireless communication unit 48 that carries out wireless communication over UWB. Accordingly, a small-distance large-amount-data wireless communication system can be constructed by easily connecting the terminal devices 40 in proximity to each other.

As described above, according to the present embodiment, it is possible to generate a fingerprint that is common only among the terminal devices 40 that are at a same place at same time, thereby making it possible to perform authentication that is common among the terminal devices 40 easily and quickly without requiring an operation by an operator (user). Furthermore, even in a range up to 10 meters, for example, when there is a region to be differentiated (in a case where extents of adjacent meeting spaces are within 10 meters or the like) in the range, it is possible to explicitly confine an authenticable and connectable physical range for each of the regions as a region where beams emitted from the code transmitters 20 intersect.

According to the embodiments, it is possible to establish communication connection in a temporarily-used area, such as a meeting room, by performing authentication of the terminal devices easily and quickly.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A wireless communication system, comprising:
   a plurality of code transmitters each configured to transmit a time-varying code, the time-varying codes transmitted from the code transmitters being different from each other;
   a plurality of code receivers each configured to receive the time-varying codes transmitted from the code transmitters and generate a fingerprint based on the received time-varying codes, the fingerprint being unique to a space where the time-varying codes are receivable; and
   a plurality of terminal devices configured to establish wireless communication connection therebetween with authentication, the terminal devices being connected to the code receivers, respectively, wherein
   each of the terminal devices includes
      a fingerprint acquiring unit configured to acquire the fingerprint from the code receiver connected thereto,
      a wireless communication unit configured to transmit and receive the fingerprint via wireless communication, and
      an authentication unit configured to authenticate, as a communications partner, another one of the terminal devices if the fingerprint received by the wireless communication unit from the another one of the terminal devices matches the fingerprint acquired by the fingerprint acquiring unit from the code receiver connected thereto.

2. The wireless communication system according to claim 1, wherein
   each of the code transmitters includes
      a light source having a predetermined beam angle, and
      a modulating unit configured to modulate a beam emitted from the light source with the time-varying code of the each of the code transmitters, and
   each of the code receivers includes
      a photo-receiver configured to receive the beam emitted from the light source of the code transmitter, and
      a demodulating unit configured to demodulate an output of the photo-receiver into the time-varying code.

3. The wireless communication system according to claim 1, wherein each of the code transmitters includes a random number generator configured to generate the time-varying code based on a random number generated by the random number generator.

4. The wireless communication system according to claim 1, wherein the wireless communication is ultra wideband wireless communication carried out using a bandwidth of 500 MHz or more or a bandwidth of 20% of a center frequency or more.

5. The wireless communication system according to claim 2, wherein the light source of the code transmitter is arranged in an indoor illuminating device.

6. The wireless communication system according to claim 2, wherein the light source of the code transmitter is an indoor illuminating device.

7. The wireless communication system according to claim 2, wherein
   the number of the code transmitters is three or more, and
   the code transmitters are arranged in a manner that the beams emitted from the light sources of the code transmitters intersect.

8. The wireless communication system according to claim 7, wherein each of the code transmitters is arranged on a movable support unit.

9. The wireless communication system according to claim 7, wherein
   the number of the code transmitters is four,
   at least one of the code receivers includes four photo-receivers each configured to receive the beams emitted from the light sources of the code transmitters, respectively, and
   at least one of the terminal devices that mutually establish the wireless communication connection is connected to the code receiver including the four photo-receivers.

10. A terminal-device authentication method in a wireless communication system including a plurality of terminal devices configured to establish wireless communication connection therebetween with authentication, the terminal-device authentication method comprising:

transmitting, by each of the code transmitters, a time-varying code, the time-varying codes transmitted from the code transmitters being different from each other;

receiving, by a plurality of code receivers connected to the terminal devices respectively, the time-varying codes transmitted from the code transmitters;

generating, by each of the code receivers, fingerprint based on the received time-varying codes, the fingerprint being unique to a space where the time-varying codes are receivable;

acquiring, by each of the terminal devices, the fingerprint from the code receiver connected thereto;

transmitting, by each of the terminal devices, the fingerprint via wireless communication;

receiving, by each of the terminal devices, the fingerprint via the wireless communication; and authenticating, as a communications partner of one of the terminal devices, another one of the terminal devices if the fingerprint received from the another one of the terminal devices matches the fingerprint acquired by the one of the terminal devices.

\* \* \* \* \*